(12) United States Patent
Neary

(10) Patent No.: US 8,348,793 B2
(45) Date of Patent: Jan. 8, 2013

(54) CHAIN TENSIONING DEVICE

(76) Inventor: John Robert Neary, Kentville (CA)

( * ) Notice: Subject to any disclaimer, the term of this patent is extended or adjusted under 35 U.S.C. 154(b) by 195 days.

(21) Appl. No.: 12/798,004

(22) Filed: Mar. 29, 2010

(65) Prior Publication Data

US 2011/0237371 A1     Sep. 29, 2011

(51) Int. Cl.
*F16H 7/08*     (2006.01)
(52) U.S. Cl. ........................................................ 474/111
(58) Field of Classification Search .................... 474/111
See application file for complete search history.

(56) References Cited

U.S. PATENT DOCUMENTS

| | | | | |
|---|---|---|---|---|
| 5,058,507 A * | 10/1991 | Muth | ............................ | 105/105 |
| 5,244,439 A * | 9/1993 | Rogus | ............................ | 474/136 |
| 5,524,725 A * | 6/1996 | Schantzen | ........................... | 180/190 |
| 6,354,972 B1* | 3/2002 | Young | ............................ | 474/101 |
| 6,699,148 B1* | 3/2004 | Taylor et al. | ........................... | 474/111 |
| 2005/0026731 A1* | 2/2005 | Skidmore et al. | ............................ | 474/116 |

* cited by examiner

*Primary Examiner* — Michael Mansen
*Assistant Examiner* — Michael Riegelman

(57) ABSTRACT

This invention describes a compact, light weight, durable, quiet in operation, economical, chain tensioning device with means for controlling chain slack between two drive sprockets, found in all terrain vehicles or the like. The assembly comprises a chain tensioning device which is spaced between the two drive sprockets. The chain tensioning device is easy to assemble, install and adjust. The device exerts a modest preload tension pressure, requires infrequent adjustment and is suitable for reversed loads.

1 Claim, 5 Drawing Sheets

CHAIN TENSIONING DEVICE

BACKGROUND OF THE INVENTION

Over a number of years the following types of chain tensioning devices have been tested on prototype all terrain vehicles. The resulting observations have led to the development of my invention.

Type 1

Adjustable, but fixed in place tensioning arm devices are best suited for non-reversing industrial applications and bear against the unloaded side of a chain.

Typically, the arm with its slider or idler sprocket is adjusted to remove most of the chain slack and is locked in place. The tensioning device would be adjusted to compensate for wear as required.

This is not suited for use in an all terrain vehicle application, in that if the chain slack is adjusted out to eliminate chain slap, the chain becomes excessively tight as it warms up. This tightness creates wear and excessive tension on chains, sprockets and bearings. If the chain is left slack, it suffers sudden take-up loading when exposed to reversing loads. The abrupt take-up further stretches chains.

Type 2

When using self-adjusting heavy-spring tensioning devices it was found that for reversing load applications the required heavy springs exert a high pre-load force against the chain. These heavy-spring tensioning devices failed when used in an all terrain vehicle application, as they are heavy in weight, difficult to install and service. They have a high pre-load force creating noise and wear on chains, sprockets and bearings.

Type 3

The "Rosta"™ type tensioning devices employ rubber elements which are compressed within a section of square metal tube surrounding their arm pivot bolts. The bolts are cam shaped to compress the rubber elements within the square tube as the arm rotates approximately 45 degrees.

These tensioning devices are not suited for moderate or heavy duty reverse loading applications because the force on the rubber element is leveraged by the length of the arm from the slider or sprocket to the rubber element. The excessive force causes even moderate sized rubber elements to fail. Also the Rosta™ tensioning device is heavier, difficult to adjust in confined space and costly.

Type 4

The technology known in hydraulic damper type tensioning devices found in combustion engines to control slack in timing belts and chains could be used, however, they would be heavier, complex and costly.

SUMMARY OF THE INVENTION

The object of my invention as described is an assembly of a chain tensioning device for controlling chain slack between two drive sprockets, found in all terrain vehicles or the like, that is compact, lightweight, durable, quiet in operation, economical, reduces time and effort in adjusting, installation and repairing.

DESCRIPTION OF THE DRAWINGS

Although the characteristic feature of the invention will be particularly pointed out in the claims, the invention itself and the manner in which it may be made and used may be better understood by referring to the following description and accompanying drawings, where like reference numerals refer to like parts throughout the several views of the drawings, in which

THE DESCRIPTION OF THE PREFERRED EMBODIMENT

Figure 1:
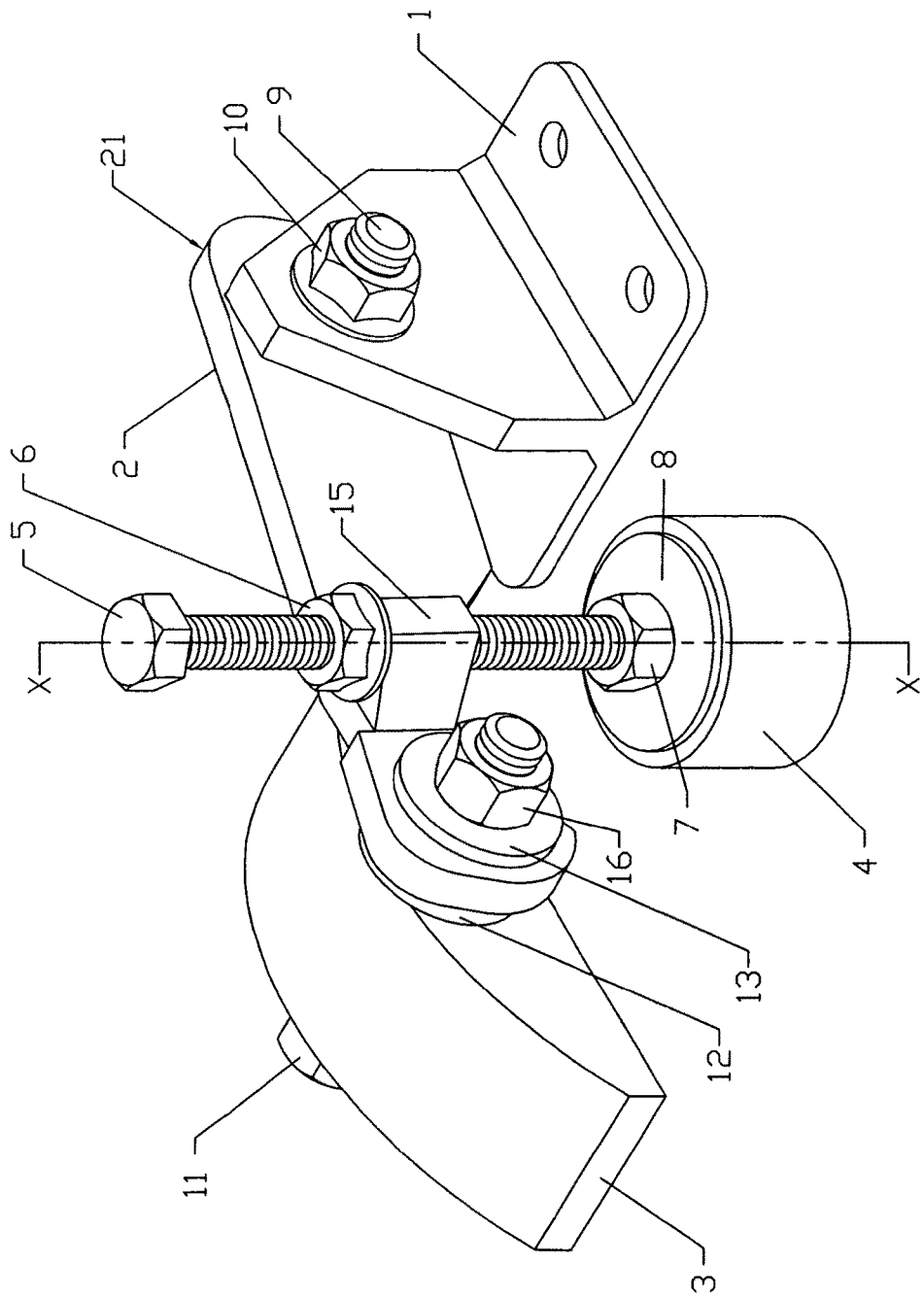
FIG. 1 is a perspective view of the assembly for the chain tensioning device for all terrain vehicles, or the like, FIG. 2 shows an exploded view of the assembly depicted in FIG. 1.
Figure 2:
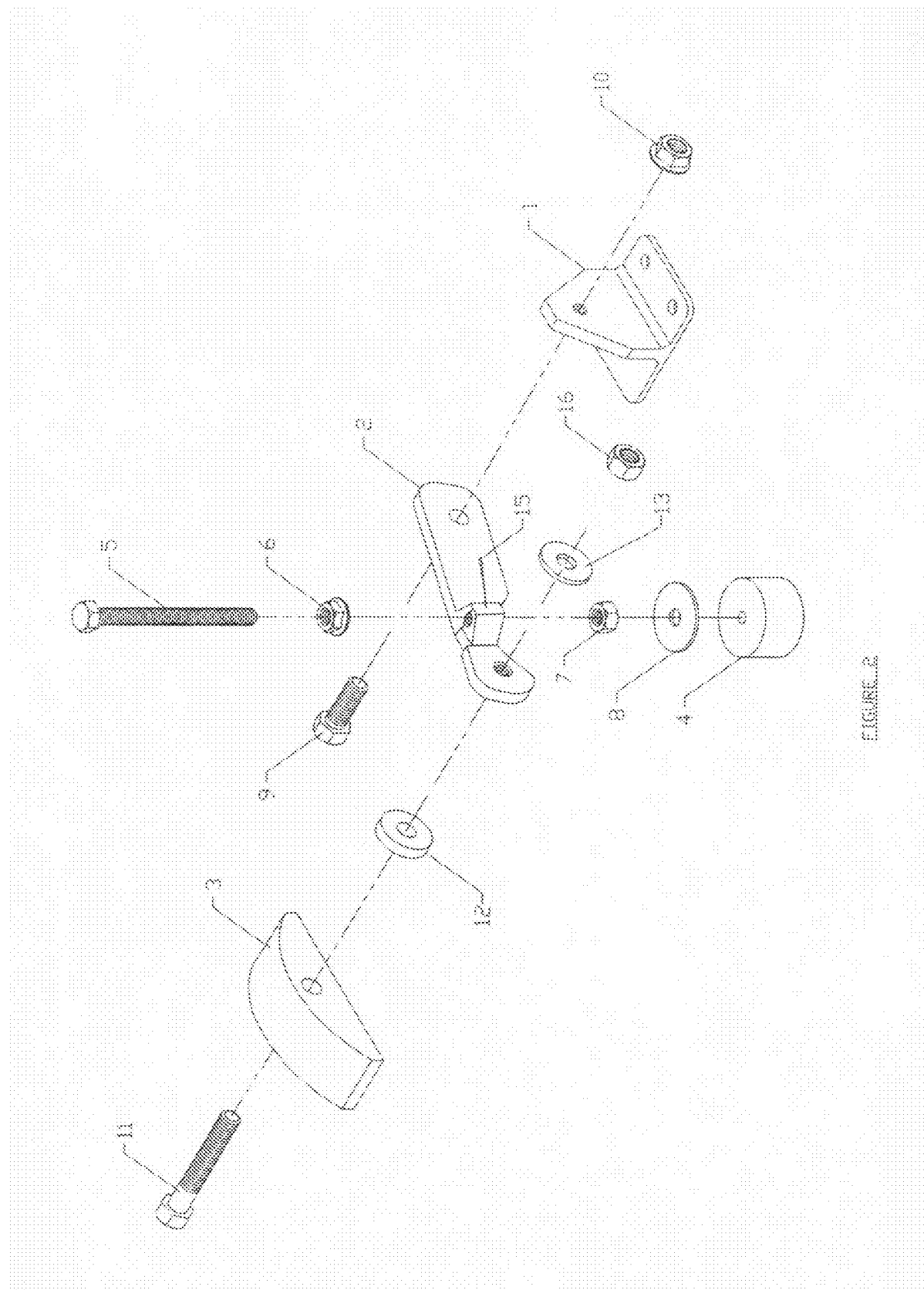
Figure 4:
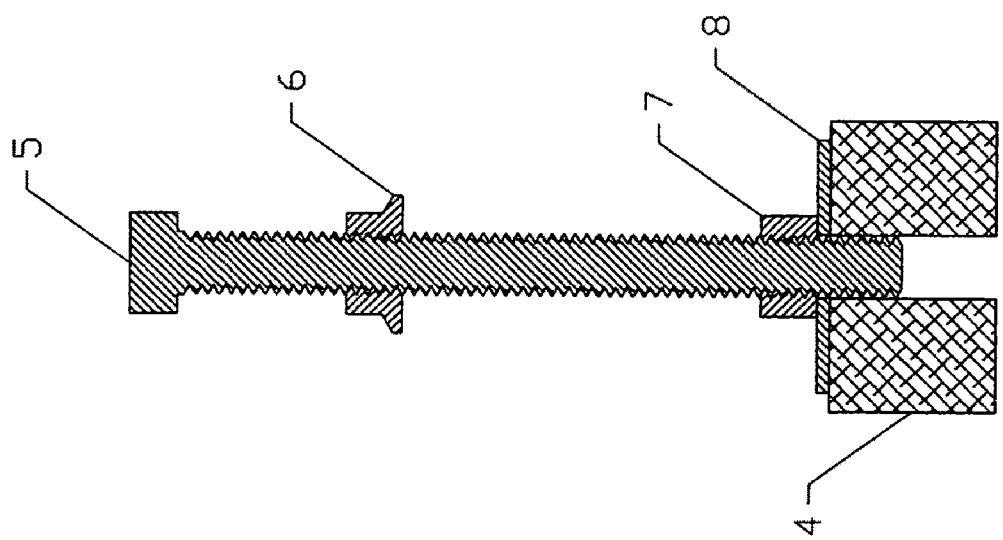
FIG. 4 is a cross-sectional view taken along line X-X.

The accompanying drawings, as described above, illustrate a preferred embodiment of an assembly for a chain tensioning device. The following disclosure, describes a preferred embodiment of a chain tensioning device comprises the following assembly of component parts. Reference from FIG. 1 and FIG. 2 a chain tensioning device assembly 21, a T shaped base bracket 1 supports a freely pivoted arm 2 which is fastened by means of a bolt 9 and a nut 10 near and on one side of one end of the arm 2. At the opposite side and end of the arm 2, is an arched toggle slider 3 made of urethane or of similar material fastened by means of a bolt 11 a washers 12 and 13 and nut 16; said arched toggle slider 3 is free to pivot thus conforming with the chain loop. Located adjacent bolt 11 and nut 16 and opposite the arched toggle slider 3 is a vertical adjustable tap-bolt 5 threaded through a nut 6 a connector nut 15 welded to the arm 2, a nut 7, a washer 8 and a compressible rubber bushing foot 4 which is threaded part way through on the end of the adjustable tap-bolt 5 (shown in FIG. 4).

Figure 3:
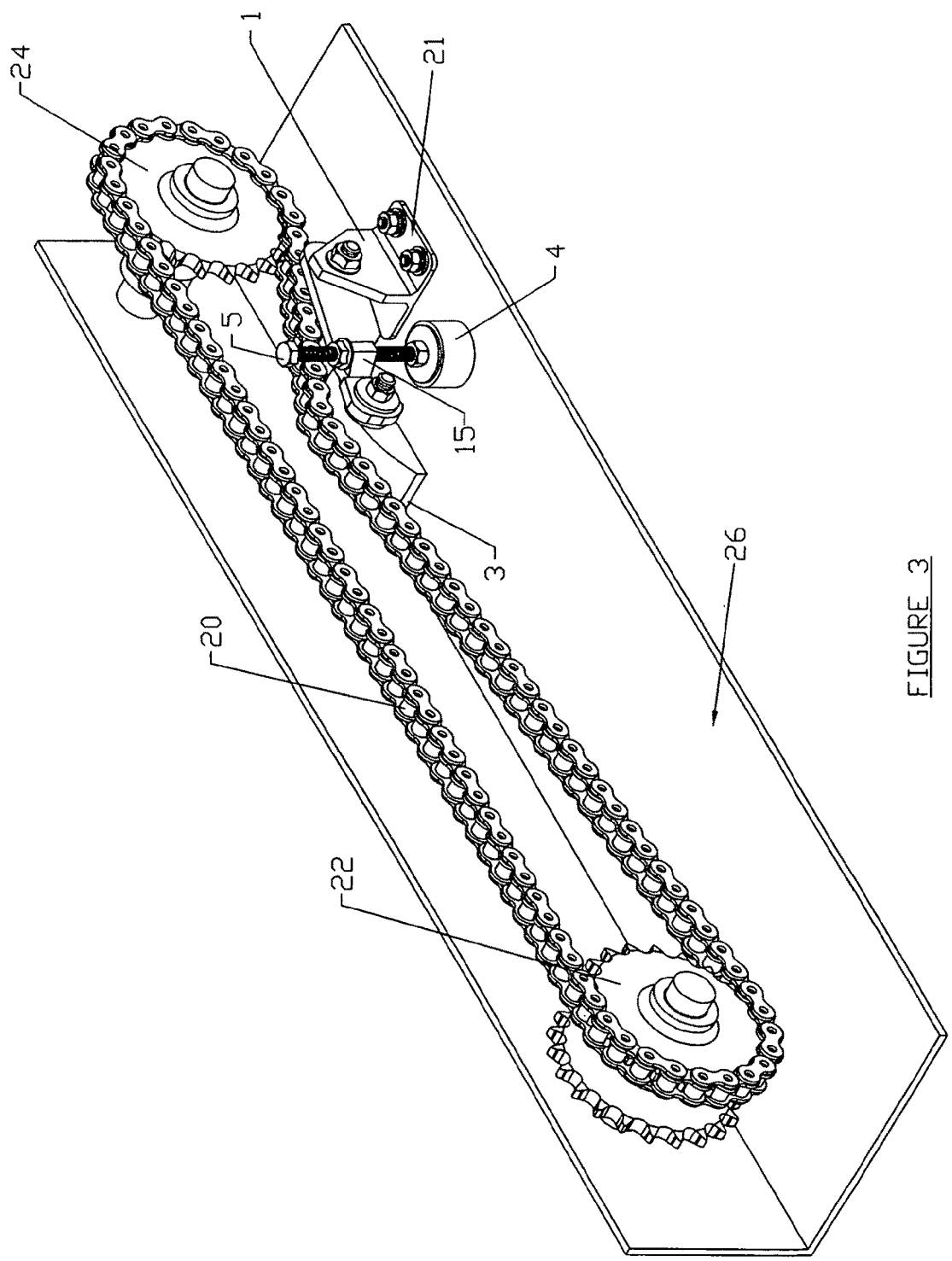
FIG. 3 shows the assembly of the chain tensioning device in its environment.

Reference from FIG. 3 the assembly of chain tensioning device 21 is shown in a functional environment. Located at either end of the chain loop 20 are two drive sprockets 22 and 24 between said drive sprockets and on the outer most often unloaded side of the chain loop, is the chain tensioning device 21, enabling easy installation and access. The T shaped base bracket 1 is mounted to a flat supporting structure 26. The pivoted arm 2 extends angularly upward where the arched toggle slider 3 lifts the chain loop 20 to form an irregular compressed loop which creates tension on the chain between the two drive sprockets 22 and 24. The vertical adjustable tap-bolt 5 extends though the connector nut 15 welded to the arm 2 and part way through the compressible rubber bushing foot 4. The manual adjustment feature of the chain tensioning device is achieved by extending or retracting the threaded tap bolt 5 applying tension on the chain loop 20 and the pressure on the compressed rubber bushing foot 4. The required adjustments are infrequent in that the chain tensioning device smoothly cushions reversing loads, by the pivoting toggle action of the arched toggle slider 3 in concert with the adjustable feature of the arm 2 vertical tap bolt 5, and the compressible rubber bushing foot 4; all of which exerts a steady, even, modest pre-load tension pressure, when the chain loop 20 is under either a forward or reversed load.

Figure 5:
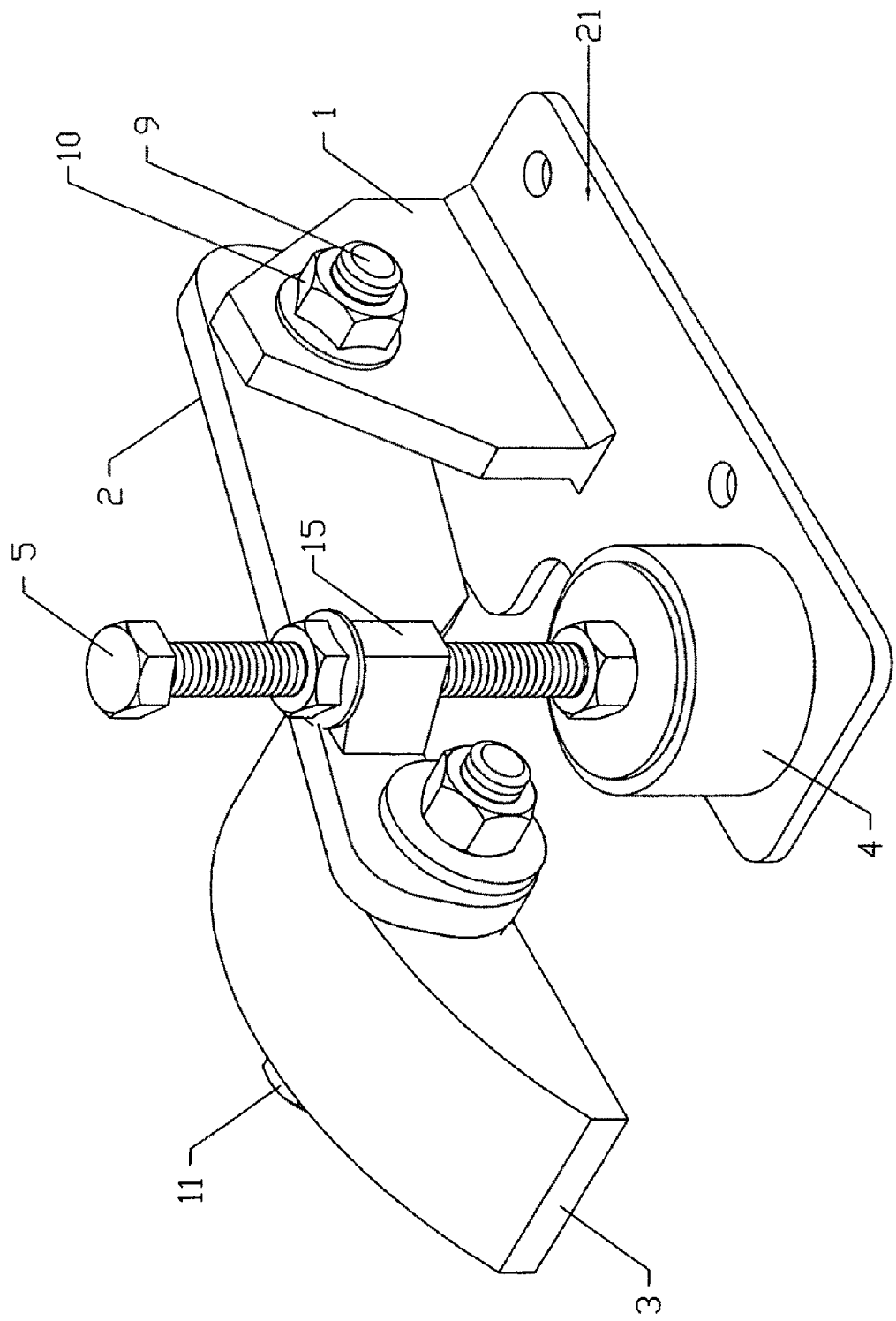
FIG. 5 is a further embodiment of the chain tensioning device where the longitudinal length of the T-bracket base has been extended.

A further embodiment of this invention is shown in FIG. 5 wherein the base of bracket 1 extends the full longitudinal length of the arm 2.

This chain tensioning assembly represents a simple compact, light weight, durable, quiet in operation, and economical device, and enables easy installation and access.

I claim:

1. A chain tensioning device connected to a support structure, which controls the tension in a chain, wherein said chain is connected between a first sprocket and a second sprocket, said chain tensioning device comprising: a T shaped base bracket wherein a first end of said T shaped base bracket is fixed to the support structure and wherein a second end of the T shaped base bracket is connected to a first end of a freely pivoted arm via a first end nut and a first end bolt in a manner which allows the freely pivoted arm to pivot around the first end bolt; an arched toggle slider is attached to a second end of said freely pivoted arm via a second end nut and a second end bolt in a manner which allows the arched toggle slider to pivot around the second end bolt; the arched toggle slider projects towards a first side of the freely pivoted arm; adjacent the arched toggle slider and projecting towards a second side of the freely pivoted arm, a connector nut is fixed to the freely pivoted arm; a vertical adjustable tap-bolt extends through the connector nut, the tap-bolt has a first end with a nut head wherein manual rotation of the nut head will adjust the tension in the chain; and a compressible rubber bushing foot is fixed to a second end of the tap bolt, wherein the bushing foot is in compressive contact with the support structure or the T shaped base bracket.

\* \* \* \* \*